US006962257B2

(12) United States Patent
Upchurch et al.

(10) Patent No.: US 6,962,257 B2
(45) Date of Patent: Nov. 8, 2005

(54) METHOD AND APPARATUS FOR REMOVING MATTER FROM A FLUID

(75) Inventors: Steven M. Upchurch, Bellbrook, OH (US); Rick A. Burnett, Jamestown, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/294,060

(22) Filed: Nov. 14, 2002

(65) Prior Publication Data

US 2004/0094487 A1 May 20, 2004

(51) Int. Cl.⁷ .............................................. B01D 29/00
(52) U.S. Cl. ....................... 210/470; 210/169; 210/473; 210/474; 210/499
(58) Field of Search ................. 210/169, 416.2, 210/470, 473, 474, 499; 4/490

(56) References Cited

U.S. PATENT DOCUMENTS

| | | | | | |
|---|---|---|---|---|---|
| 3,625,364 | A | * | 12/1971 | LaChance | 210/169 |
| 4,053,412 | A | * | 10/1977 | Stix | 210/169 |
| 4,089,074 | A | * | 5/1978 | Sermons | 210/169 |
| 4,140,634 | A | * | 2/1979 | Harry | 210/169 |
| 4,369,109 | A | * | 1/1983 | Edge | 210/169 |
| 4,836,920 | A | * | 6/1989 | Miller, Jr. | 210/169 |
| 4,865,282 | A | * | 9/1989 | Yonkman et al. | 248/111 |
| 5,043,060 | A | * | 8/1991 | Brennan | 210/122 |
| 5,139,660 | A | * | 8/1992 | Lourie et al. | 210/169 |
| 5,173,181 | A | * | 12/1992 | McFarland | 210/169 |
| 5,223,135 | A | * | 6/1993 | MacPhee et al. | 210/242.1 |
| 5,264,122 | A | * | 11/1993 | Lakotish | 210/169 |
| 5,277,801 | A | * | 1/1994 | Lundquist | 210/169 |
| 5,279,728 | A | * | 1/1994 | Weiss | 210/169 |
| 5,283,928 | A | * | 2/1994 | Linn et al. | 15/257.06 |
| 5,288,414 | A | * | 2/1994 | Mongiello | 210/776 |
| 5,350,508 | A | * | 9/1994 | Van der Watt | 210/169 |
| 5,422,001 | A | * | 6/1995 | Yagoda et al. | 210/169 |
| 5,487,830 | A | * | 1/1996 | Huppert | 210/169 |
| D369,449 | S | * | 4/1996 | Stiefel et al. | D32/35 |
| 5,614,085 | A | * | 3/1997 | Platt, III | 210/169 |
| 5,705,058 | A | * | 1/1998 | Fischer | 210/169 |
| 5,759,388 | A | * | 6/1998 | Cote | 210/169 |
| 5,849,184 | A | * | 12/1998 | Veillet | 210/169 |
| 5,911,878 | A | * | 6/1999 | Benvenuto et al. | 210/169 |
| 5,919,359 | A | * | 7/1999 | Bisseker | 210/169 |
| 5,951,858 | A | * | 9/1999 | Soto et al. | 210/169 |
| 6,119,303 | A | * | 9/2000 | Passafiume | 15/257.06 |
| 6,132,604 | A | * | 10/2000 | Kirchoff | 210/169 |
| 6,270,683 | B1 | * | 8/2001 | Turner | 210/776 |
| 6,306,295 | B1 | * | 10/2001 | Giacalone | 210/169 |
| 6,358,410 | B1 | * | 3/2002 | Lambert | 210/169 |
| 6,398,952 | B1 | * | 6/2002 | Baer | 210/169 |
| 2004/0094487 | A1 | * | 5/2004 | Upchurch et al. | 210/791 |

* cited by examiner

*Primary Examiner*—Robert James Popovics
(74) *Attorney, Agent, or Firm*—Armstrong Teasdale LLP; William Scott Andes

(57) ABSTRACT

A method for removing matter from fluid contained within a tank. The method includes inserting a filter within the fluid, and circulating the fluid within the tank such that a portion of the fluid is passed through the filter such that matter contained within the fluid is retained by the filter.

13 Claims, 5 Drawing Sheets

METHOD AND APPARATUS FOR REMOVING MATTER FROM A FLUID

BACKGROUND OF THE INVENTION

This invention relates generally to fluids, and more specifically to a method and apparatus for removing particulate matter from a fluid.

Many components are manufactured by casting the component using a mold. At least some known casting molds are created by dipping a wax pattern into a ceramic slurry. The ceramic slurry may contain undesired particles of hardened slurry and/or other debris that may have fallen into the slurry tank. Some of these particles may adhere to the wax pattern when the pattern is dipped into the slurry, and thereby undesirably become part of the mold. Particles that have adhered to the wax pattern may need to be removed from the mold after a casting is poured into the mold. However, removing such particle matter from the mold after a casting is poured may be time-consuming and may damage the casting and/or mold.

At least some known methods to facilitate removing undesired particles from a slurry include manually inserting a filter within, and removing the filter from, the slurry. The process may need to be repeated several times, and when such a method is used an operator may have to insert at least a portion of their hands and/or arms into the slurry. Furthermore, repeatedly inserting and removing the filter may expose the operator to potential lower back strain and/or other injuries. In addition, depending on a size of the tank, such methods may produce only limited results.

BRIEF DESCRIPTION OF THE INVENTION

A method is provided for removing matter from fluid contained within a tank. The method includes inserting a filter within the fluid, and circulating the fluid within the tank such that a portion of the fluid is passed through the filter such that matter contained within the fluid is retained by the filter.

A filter is provided for removing matter from fluid contained within a tank. The filter includes a body having a first end, a second end, and a plurality of openings extending through the body. The openings are configured to allow fluid to pass therethrough. The filter also includes a basket extending outwardly from the body second end. The basket is configured to capture matter contained within the fluid when the basket is positioned within fluid circulating within the tank.

A filter assembly is provided including a tank for retaining a slurry therein. The assembly also includes a filter having a body and a basket extending outwardly from the body. The filter body includes a plurality of openings extending therethrough and configured to allow a portion of the slurry to pass therethrough. At least a portion of the filter is positioned within the slurry. The basket is configured to retain matter suspended within the slurry when the slurry is circulated within the tank.

DETAILED DESCRIPTION OF THE INVENTION

As used herein, the term "matter" may include any undesired substance in a fluid. For example, "matter" may include particles of hardened fluid and/or other debris that has fallen into the fluid. The above examples are intended as exemplary only, and thus are not intended to limit in any way the definition and/or meaning of the term "matter". Furthermore, although the invention is described herein in association with a slurry, and more specifically for removing undesired matter from a slurry, it should be understood that the present invention may be applicable to any process used for filtering a fluid. Accordingly, practice of the present invention is not limited to the removal of undesired matter from a slurry.

Figure 1:
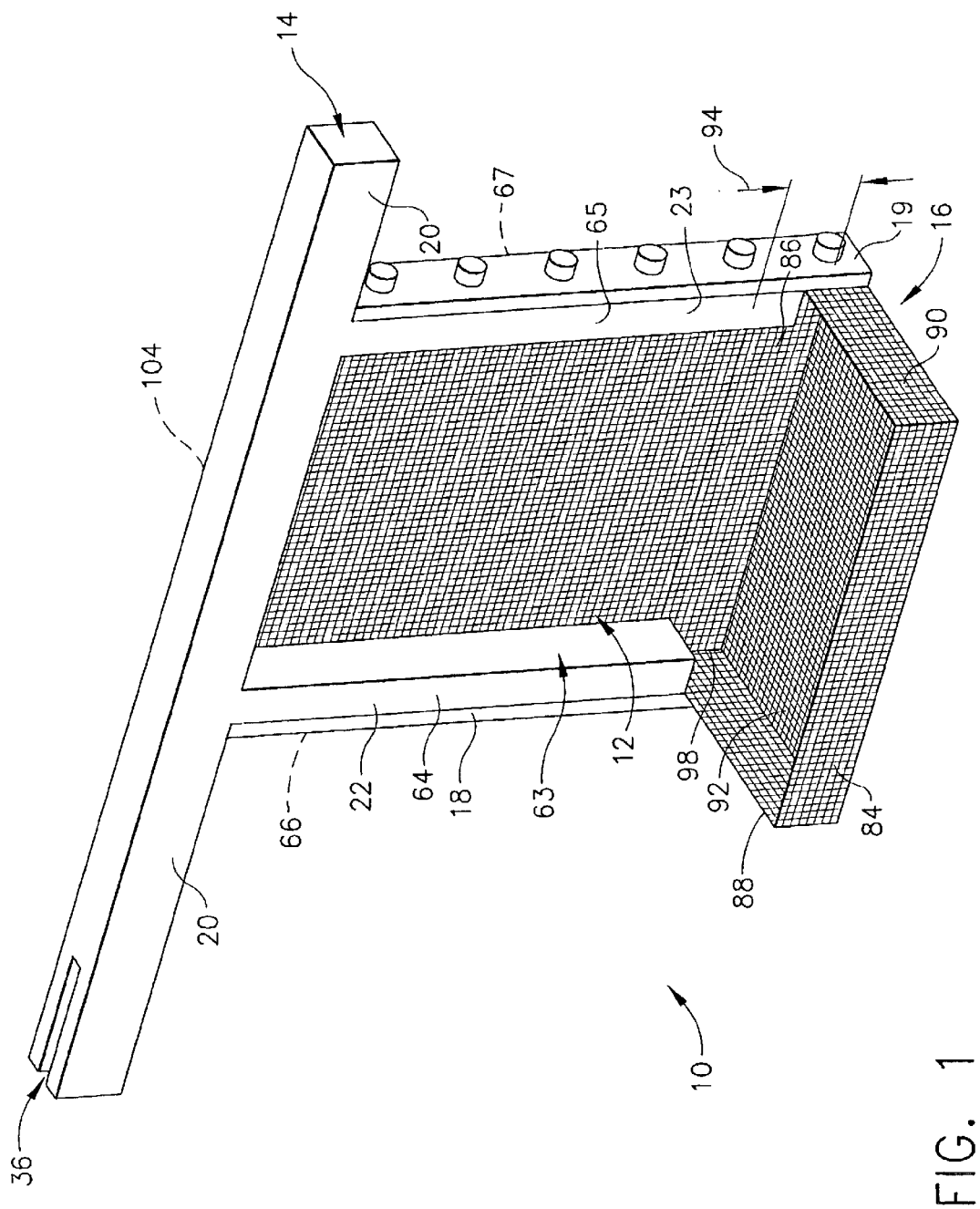
FIG. 1 is a perspective view of an exemplary slurry filter.
Figure 2:
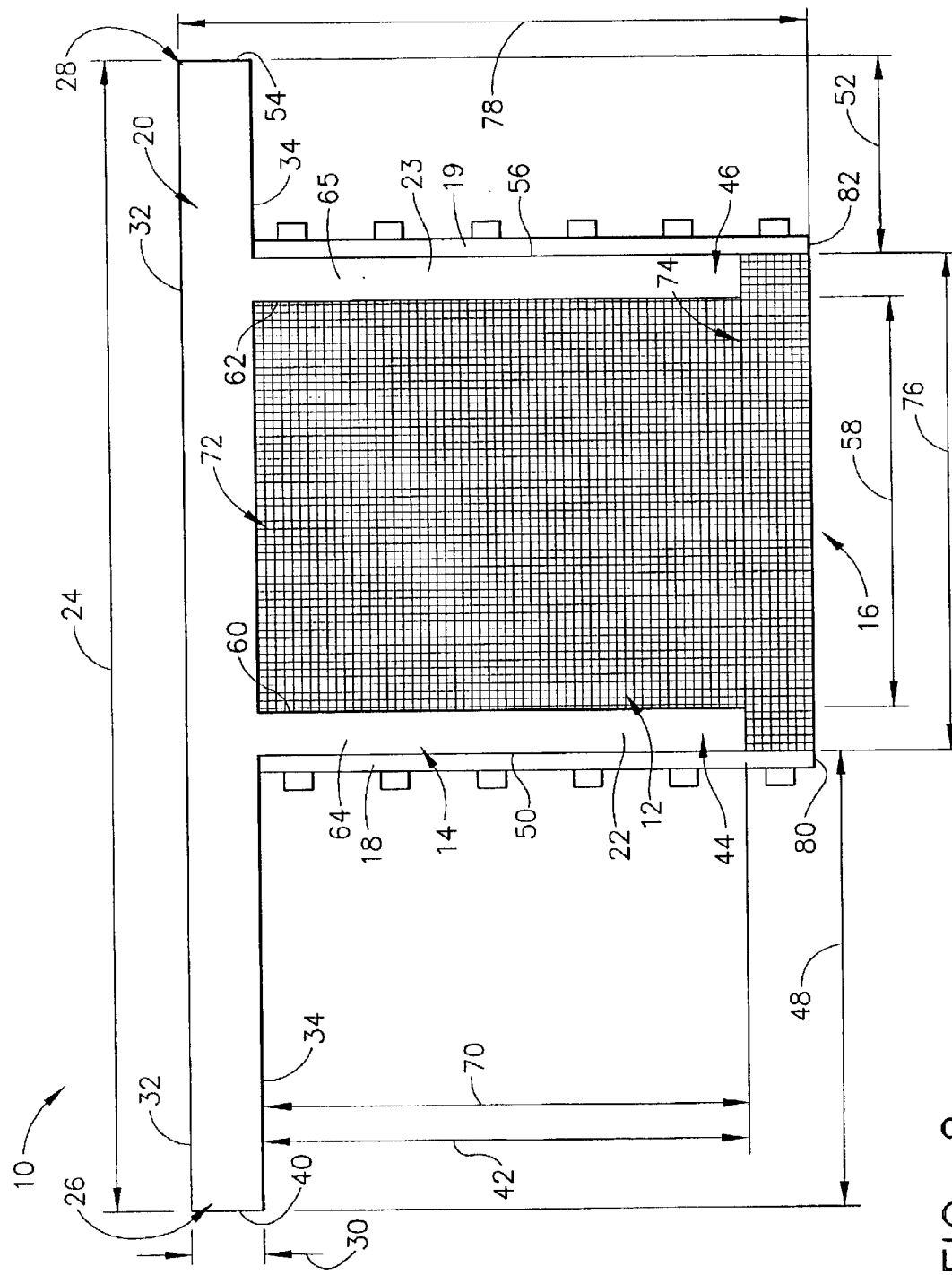
FIG. 2 is front view of the slurry filter shown in FIG. 1.
Figure 3:
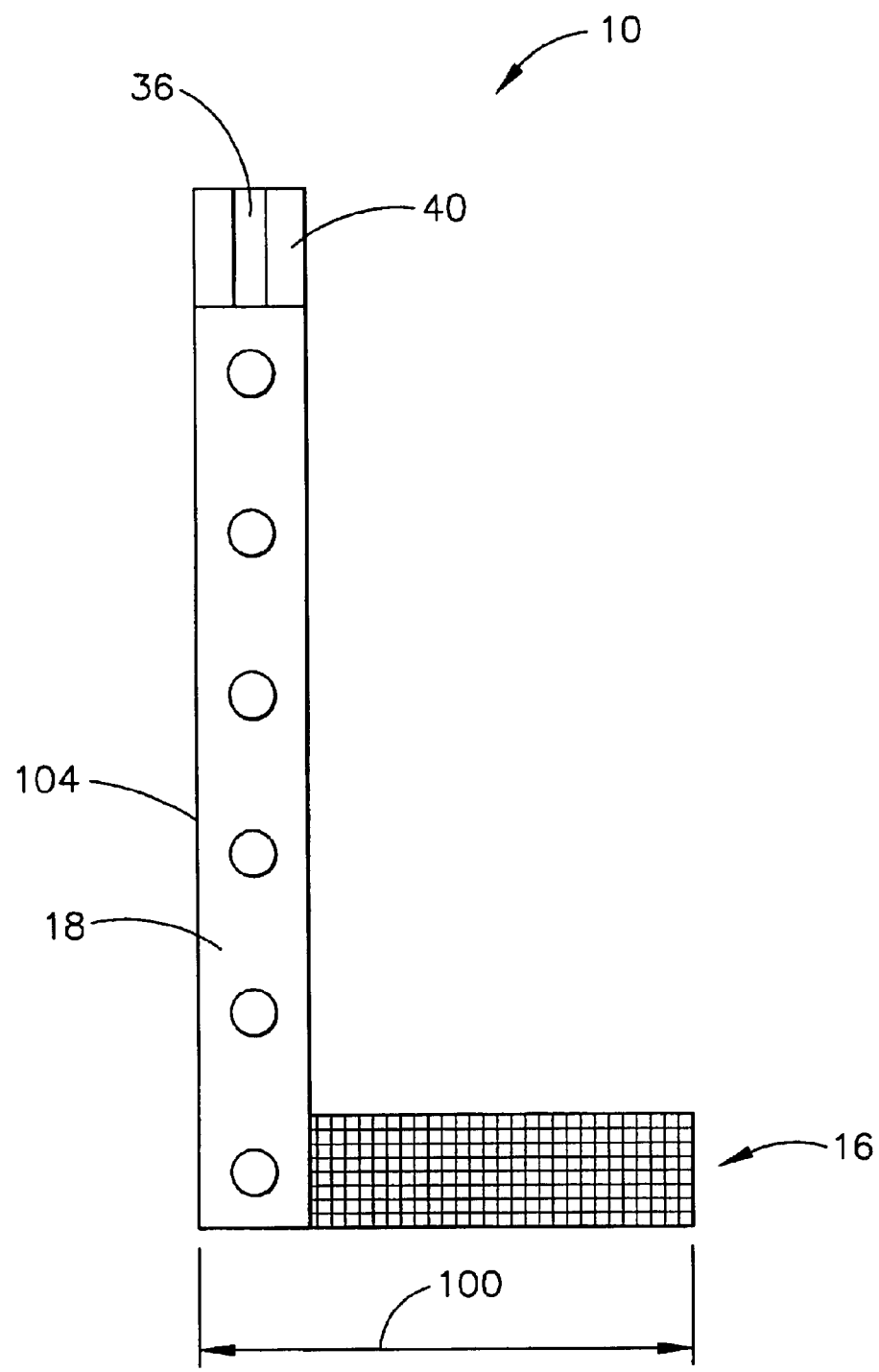
FIG. 3 is a side view of the slurry filter shown in FIGS. 1 and 2.
Figure 4:
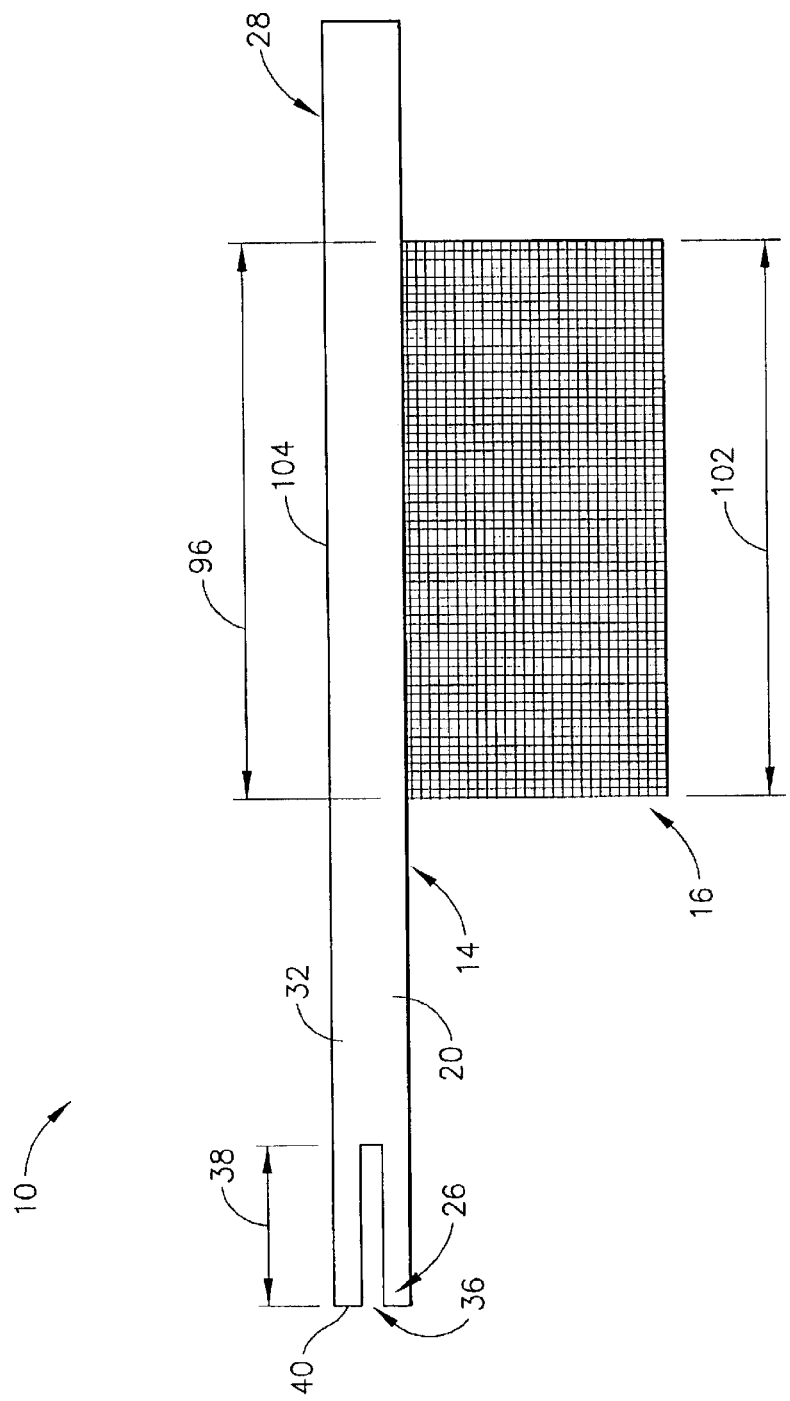
FIG. 4 is a top view of the slurry filter shown in FIGS. 1–3.

FIG. 1 is a perspective view of an exemplary slurry filter 10, FIG. 2 is a front view of slurry filter 10, FIG. 3 is a side view of slurry filter 10, and FIG. 4 is a top view of slurry filter 10. Slurry filter 10 includes a body 12, a frame 14, a basket 16, and a plurality of attachment plates 18 and 19. Frame 14 includes a handle portion 20 and a plurality of legs 22 and 23 that extend outwardly from frame handle portion 20. Handle portion 20 has a width 24 measured between a first end 26 and a second end 28. In addition, handle portion 20 has a height 30 measured between an upper surface 32 and a lower surface 34 of handle portion 20.

Handle portion 20 includes a slot 36 that is adjacent handle portion first end 26. Slot 36 extends a length 38 from an outer surface 40 of handle portion first end 26 towards handle portion second end 28. More specifically, slot 36 extends completely through outer surface 40 such that slot 36 is open at handle portion first end 26. In addition, slot 36 extends completely through handle portion 20 between upper surface 32 and lower surface 34, such that slot 36 defines a passageway through handle portion 20, and more specifically through handle portion height 30.

Frame legs 22 and 23 each extend a length 42 measured from handle portion lower surface 34 to respective leg ends 44 and 46. Frame leg 22 is spaced a distance 48 from handle portion first end 26 measured with respect to an outer surface 50 of frame leg 22. Similarly, frame leg 23 is spaced a distance 52 from handle portion second end 28 measured with respect to an outer surface 56 of frame leg 23. Frame leg 22 is also spaced a distance 58 from frame leg 23 measured with respect to an inner surface 60 of frame leg 22 and an inner surface 62 of frame leg 23. Distance 58 and length 42 define a frame opening 63. Frame legs 22 and 23 include respective front surfaces 64 and 65 and respective back surfaces 66 and 67.

Filter body 12 has a height 70 measured between an upper end 72 and a lower end 74. As will be discussed in more detail below, a length of filter body 12 may be greater than a distance 76 measured between frame leg outer surface 50 and frame leg outer surface 56, such that a portion of filter body 12 may be partially wrapped around frame legs 22 and 23, and secured between respective attachment plates 18 and 19 and respective frame legs 22 and 23. In the exemplary embodiment, filter body 12 is a woven wire cloth that includes a plurality of openings therethrough. In one embodiment, filter body 12 is formed from a woven wire cloth having a wire diameter between approximately 0.020 and 0.030 inches. In addition, in one embodiment, the plurality of openings in filter body 12 are substantially square-shaped and each opening has a width between approximately 0.070 and 0.080 inches. Although filter body 12 is herein described and illustrated as being formed from a substantially porous material, specifically a woven wire cloth having substantially square-shaped openings, it should be understood that filter body 12 may be formed from any material and/or process, and may include any shape and/or configuration of openings, suitable for filtering matter from a fluid. For example, in an alternative embodiment, filter body 12 is formed from a substantially non-porous material and includes a plurality of openings to facilitate passing a portion of a slurry through filter body 12. Furthermore, in another alternative embodiment, and for example, filter body 12 is formed from a substantially porous material other than woven wire cloth.

Attachment plates 18 and 19 are coupled to respective frame legs 22 and 23 to enable filter body 12 to be coupled to frame 14. In the exemplary embodiment, attachment plates 18 and 19 couple filter body 12 to frame 14 using threaded bolts and threaded openings (not shown) in frame legs 22 and 23. However, it should be understood that attachment plates 18 may couple filter body 12 to frame 14 in any suitable manner, such as, and for example, with an adhesive. Attachment plates 18 and 19 have a height 78 measured between handle portion lower surface 34 and respective attachment plate ends 80 and 82.

Filter basket 16 includes a front wall 84, a back wall 86, a first side wall 88, a second side wall 90, and a bottom 92. Basket back wall 86 extends a height 94 measured between filter body lower end 74 and bottom 92, and extends a length 96 measured between a first end (not shown) and a second end 98. First side wall 88 extends from back wall second end 98 to front wall 84, and second side wall 90 extends from the back wall first end to front wall 84. Front wall 84 extends between first side wall 88 and second side wall 90. Basket bottom 92 extends a distance 100 measured between front wall 84 and back wall 86, and extends a length 102 measured between first side wall 88 and second side wall 90. In the exemplary embodiment, front wall 84, back wall 86, first side wall 88, and second side wall 90 are each substantially perpendicular to bottom 92. In an alternative embodiment, at least one of front wall 84, back wall 86, first side wall 88, and second side wall 90 is non-perpendicular with respect to bottom 92. In addition, in the exemplary embodiment, basket bottom length 102 is substantially uniform along basket bottom distance 100. In an alternative embodiment, basket bottom length 102 is not substantially uniform along basket bottom distance 100. Furthermore, in the exemplary embodiment basket bottom distance 100 is substantially uniform along basket bottom length 102. In an alternative embodiment, basket bottom distance 100 in not substantially uniform along basket bottom length 102.

In one embodiment, basket 16 is formed integrally with filter body 12. In an alternative embodiment, basket 16 is a separate component coupled to filter body 12 in any suitable manner. Filter basket 16 is connected to filter body 12 at an intersection between filter body lower end 74 and basket back wall 86. In one embodiment, a portion of basket first side wall 88 is connected to filter body lower end 74 adjacent the filter body first end, and a portion of basket second side wall 90 is connected to filter body lower end 74 adjacent the filter body second end. In addition, in the exemplary embodiment, filter basket 16 is a woven wire cloth including a plurality of openings therein. In one embodiment, basket 16 is formed from a woven wire cloth having a wire diameter between approximately 0.020 and 0.030 inches. In addition, in one embodiment, the plurality of openings in filter basket 16 are substantially square-shaped and each opening has a length between approximately 0.070 and 0.080 inches. Although filter basket 16 is herein described and illustrated as being formed from a substantially porous material, specifically woven wire cloth having substantially square-shaped openings, it should be understood that filter basket 16 may be formed from any material and/or process, and may include any shape and/or configuration of openings, suitable for containing matter from a slurry. For example, in an alternative embodiment, basket 16 is formed from a substantially non-porous material and includes only one opening to facilitate draining excess fluid from basket 16 when basket 16 is removed from a slurry. In another alternative embodiment, and for example, basket 16 is formed from a substantially non-porous material that does not include any openings.

To assemble filter 10, basket 16 is coupled to filter body 12 unless basket 16 is integrally formed with filter body 12. Filter body 12 is then positioned against frame leg back surface 66 and frame leg back surface 67 such that filter body 12 extends between frame leg 22 and frame leg 23, a portion of the filter body second end extends beyond frame leg outer surface 56, and a portion of the filter body first end extends beyond frame leg outer surface 50. The portions of filter body 12 that extend beyond frame leg outer surface 50 and frame leg outer surface 56 are partially wrapped around frame legs 22 and 23 and secured between respective attachment plates 18 and 19 and respective legs 22 and 23. More specifically, the portion of the filter body second end that extends beyond frame leg outer surface 56 is partially wrapped around frame leg 23 and attachment plate 19 is coupled with frame leg 23 such that a portion of the filter body second end is fixedly secured between attachment plate 19 and frame leg 23. In addition, the portion of the filter body first end that extends beyond frame leg outer surface 50 is partially wrapped around frame leg 22 and attachment plate 18 is coupled with frame leg 22 such that a portion of the filter body first end is fixedly secured between attachment plate 18 and frame leg 22. In the exemplary embodiment, filter body 12 is secured to frame 14 such that filter body 12 and basket back wall 86 completely cover frame opening 63 along a back side 104 of frame 14.

Figure 5:
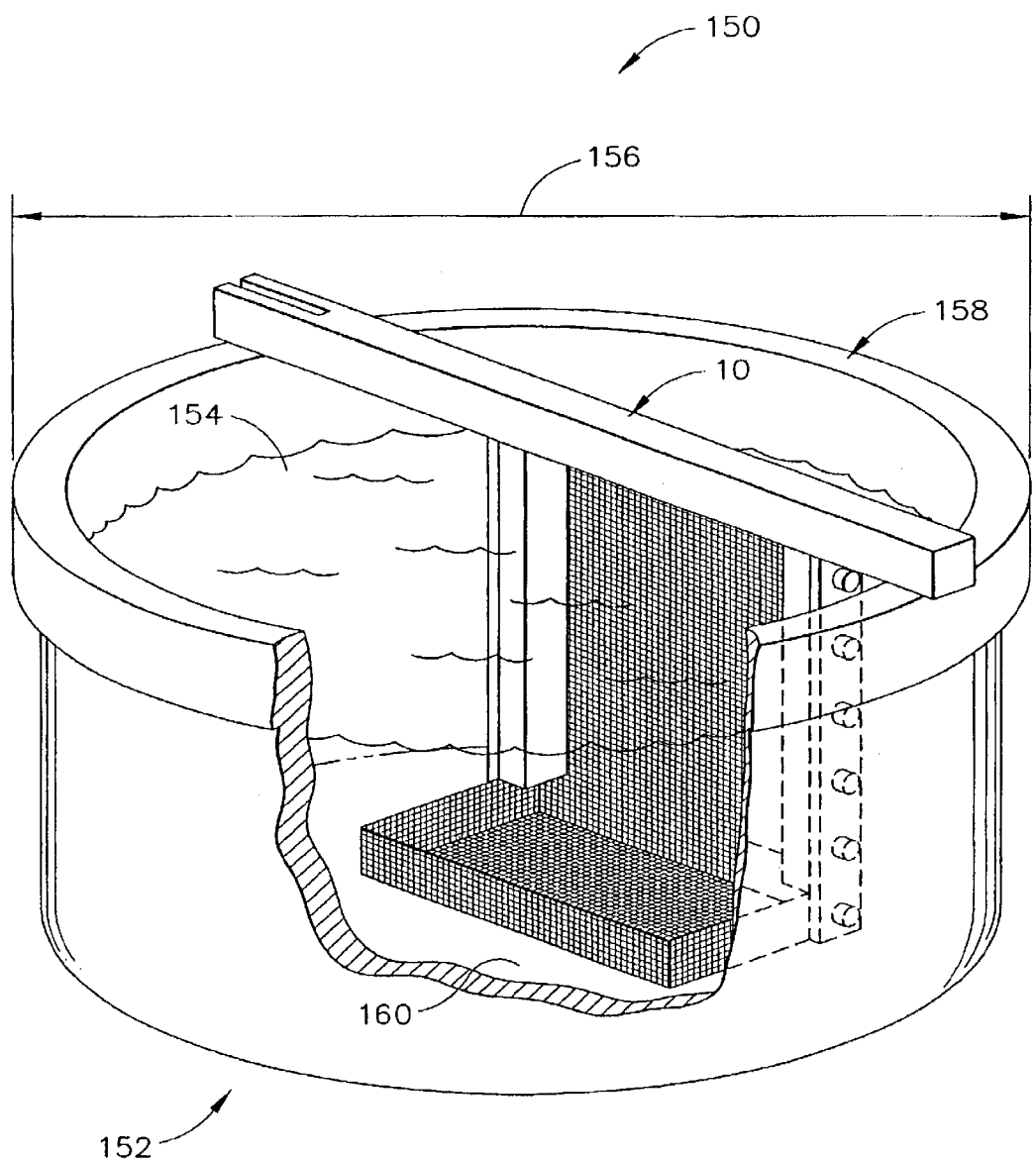
FIG. 5 is a perspective view of a slurry filter assembly including the slurry filter shown in FIGS. 1–4.

FIG. 5 is a perspective view of a slurry filter assembly 150 including slurry filter 10. Slurry filter assembly 150 includes a slurry tank 152 having a slurry 154 contained therein. In the exemplary embodiment, tank 152 is partially cylindrical. However, it should be understood that tank 152 may be any suitable shape. In one embodiment, slurry 154 is a ceramic slurry. To facilitate removing undesired matter from slurry 154, slurry filter 10 is partially inserted within, and received by, slurry tank 152 and slurry 154. In one embodiment, slurry filter 10 is manually inserted within slurry tank 152 and slurry 154 by an operator. In another embodiment, slurry filter 10 is automatically inserted within slurry tank 152 and slurry 154 by a machine coupled to frame handle portion 20 of slurry filter 10.

In the exemplary embodiment, frame handle portion width 24 is substantially equal to, or greater than, a diameter 156 of slurry tank 152 such that frame handle portion 20 rests across a top 158 of tank 152 while filter 10 is suspended within slurry 154 without contacting a bottom 160 of tank 152. However, it should be understood that frame handle portion 20 may be configured in any shape, and may contact or couple with any portion of tank 152 or a surface (not shown) not on tank 152, such that filter 10 is suspended within slurry 154 without contacting tank bottom 160. In addition, in an alternative embodiment, a portion of filter 10 rests on tank bottom 160.

Once filter 10 is received within slurry 154, slurry 154 is circulated within tank 152 such that slurry 154 passes through filter body 12. In one embodiment, tank 152 is rotated to circulate slurry within tank 152 and filter 10 does not rotate along with tank 152 to facilitate passing slurry 154 through filter 10. In another embodiment, tank 152 is rotated to circulate slurry 154 within tank 152, and filter 10 rotates along with tank 152 to facilitate passing slurry 154 through filter 10. As slurry 154 passes through filter body 112, particles of matter within slurry 154 that are larger than the openings within body 112 do not pass through filter body 112. Gravity, along with the circulation of slurry 154 within tank 152, causes the particles of matter larger than the filter body openings to fall down along filter body 12 until they are captured by filter basket 16. In one embodiment, filter basket 16 includes a top (not shown) that partially encloses basket 16 to facilitate retaining particles of matter within basket 16 while filter 10 remains in slurry 154 and during removal of filter 10 from slurry 154. Filter 10 may remain within slurry 154 as long as filtering is desired. When filtering is no longer desired, filter 10 is removed from slurry 154 and tank 152 to remove the particles captured within basket 16 from slurry 154. In one embodiment, slurry filter 10 is manually removed from slurry tank 152 and slurry 154 by an operator. In another embodiment, slurry filter 10 is automatically removed from slurry tank 152 and slurry 154 by a machine coupled to frame handle portion 20 of slurry filter 10. Filter basket 16 is then emptied and the particles captured by basket 16 are disposed.

The above-described filter is cost-effective and highly reliable for removing undesired matter from a slurry. The filter permits matter to be removed from a slurry without repeatedly inserting and removing a filter from the slurry, and may facilitate complete removal of all undesired matter. More specifically, the filter facilitates removing matter from a slurry without requiring an operator to insert the operator's hands and/or arms within the slurry and with a reduced risk of operator injury. In addition, the filter may be automatically inserted within and removed from the slurry, therefore requiring minimal input from an operator. As a result, the filter facilitates reducing manufacturing costs in a cost-effective and reliable manner.

Exemplary embodiments of filter assemblies are described above in detail. The assemblies are not limited to the specific embodiments described herein, but rather, components of each assembly may be utilized independently and separately from other components described herein. Each filter assembly component can also be used in combination with other filter assembly components.

While the invention has been described in terms of various specific embodiments, those skilled in the art will recognize that the invention can be practiced with modification within the spirit and scope of the claims.

What is claimed is:

1. A filter for removing matter from fluid contained within a tank, said filter comprising:
   a body comprising an upper first end, a lower second end, and a plurality of openings extending through said body, said openings configured to allow fluid to pass therethrough, said filter configured to retain the matter to be removed;
   a basket extending outwardly from said body lower second end and configured to capture matter contained within the fluid when said basket is positioned within fluid circulating within the tank; and
   a frame coupled to said body, said frame comprising a handle adjacent said upper first end and a pair of legs, wherein at least a portion of said handle contacts an uppermost portion of the tank to facilitate suspending said filter within the fluid, said body is coupled to said legs by a pair of attachment plates, wherein a portion of said filter body extends beyond each of said legs such that a portion of said filter body is fixedly secured between an outer surface of each leg and one of said attachment plates.

2. A filter in accordance with claim 1 wherein said basket comprises at least one opening extending therethrough and configured to allow a portion of the fluid to pass therethrough.

3. A filter in accordance with claim 1 wherein said filter body comprises a woven wire cloth.

4. A filter in accordance with claim 1 wherein said basket comprises a woven wire cloth.

5. A filter in accordance with claim 1 wherein said filter body openings are substantially square-shaped.

6. A filter in accordance with claim 2 wherein said at least one basket opening is substantially square-shaped.

7. A filter in accordance with claim 1 wherein said pair of legs extend substantially perpendicularly from said frame handle.

8. A filter in accordance with claim 1 wherein said handle comprises polypropylene.

9. A filter assembly comprising:
   a tank for retaining a slurry therein; and
   a filter comprising a body extending between an upper first end and a lower second end, a pair of legs, and a basket extending outwardly from said body lower second end, said basket coupled to said pair of legs via a pair of attachment plates, said filter body comprising a plurality of openings extending therethrough and configured to allow a portion of said slurry to pass therethrough, at least a portion of said filter positioned within the slurry, said basket configured to retain matter suspended within the slurry when the slurry is circulated within said tank, said filter body lower second end is between said body first end and a lower surface of the tank when said filter is positioned for operation within the slurry.

10. A filter assembly in accordance with claim 9 wherein said tank configured to be rotated to facilitate circulating the slurry within said tank.

11. A filter assembly in accordance with claim 9 wherein said tank is rotatable with resect to said filter to facilitate passing a portion of the slurry through said filter body openings.

12. A filter assembly in accordance with claim 9 wherein said filter further comprises a handle coupled to said filter body.

13. A filter assembly in accordance with claim 12 wherein at least a portion of said handle contacts a portion of said tank to facilitate suspending said filter within said slurry.

* * * * *